(12) United States Patent
Strait et al.

(10) Patent No.: US 8,090,883 B2
(45) Date of Patent: *Jan. 3, 2012

(54) METHOD, SYSTEM AND COMPUTER PROGRAM PRODUCT FOR ENHANCED SHARED STORE BUFFER MANAGEMENT SCHEME WITH LIMITED RESOURCES FOR OPTIMIZED PERFORMANCE

(75) Inventors: Gary E. Strait, Poughkeepsie, NY (US); Mark A. Check, Hopewell Junction, NY (US); Hong Deng, Poughkeepsie, NY (US); Diana L. Orf, Hyde Park, NY (US); Hanno Ulrich, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,198

(22) Filed: Aug. 4, 2010

(65) Prior Publication Data
US 2010/0325321 A1 Dec. 23, 2010

Related U.S. Application Data

(63) Continuation of application No. 12/030,352, filed on Feb. 13, 2008, now Pat. No. 7,886,089.

(51) Int. Cl.
*G06F 13/00* (2006.01)
(52) U.S. Cl. ................. 710/52; 710/53; 710/54; 710/57
(58) Field of Classification Search .................... 710/52, 710/54, 57
See application file for complete search history.

(56) References Cited

U.S. PATENT DOCUMENTS

| | | | |
|---|---|---|---|
| 5,696,930 A | 12/1997 | Garetz et al. | |
| 6,047,001 A | 4/2000 | Kuo et al. | |
| 6,085,276 A | 7/2000 | VanDoren et al. | |
| 6,112,267 A | 8/2000 | McCormack et al. | |
| 6,915,371 B1 | 7/2005 | Berndt et al. | |
| 7,620,693 B1 | 11/2009 | Mott et al. | |
| 7,660,998 B2 | 2/2010 | Walmsley | |
| 7,813,369 B2 * | 10/2010 | Blackmore et al. | 370/429 |
| 2005/0122971 A1 | 6/2005 | Morrison | |
| 2006/0107003 A1 | 5/2006 | Barnum et al. | |

OTHER PUBLICATIONS

Cornell et al.; "Integration of Buffer Management and query Optimization in Relational Database Environment", IBM Thomas J. Watson Research Center, Yorktown Heights, NY 10598; pp. 247-256.
Z/Architecture Principles of Operation, Sixth Edition (Apr. 2007), 1216 pages (split into 4 parts).
IBM—Technical Disclosure Bulletin; "Efficient Memory Allocation for Packet Data Transfers"; vol. 32, No. 1; Jun. 1989 pp. 448-451.

* cited by examiner

*Primary Examiner* — Tammara Peyton
(74) *Attorney, Agent, or Firm* — Cantor Colburn LLP; John Campbell

(57) ABSTRACT

The exemplary embodiment of the present invention provides a storage buffer management scheme for I/O store buffers. Specifically, the storage buffer management system as described within the exemplary embodiment of the present invention is configured to comprise storage buffers that have the capability to efficiently support 128 byte or 256 byte I/O data transmission lines. The presently implemented storage buffer management scheme enables for a limited number of store buffers to be associated with a fixed number of storage state machines (i.e., queue positions) and thereafter the allowing for the matched pairs to be allocated in order to achieve maximum store throughput for varying combinations of store sizes of 128 and 256 bytes.

18 Claims, 4 Drawing Sheets

US 8,090,883 B2

METHOD, SYSTEM AND COMPUTER PROGRAM PRODUCT FOR ENHANCED SHARED STORE BUFFER MANAGEMENT SCHEME WITH LIMITED RESOURCES FOR OPTIMIZED PERFORMANCE

CROSS REFERENCE TO RELATED APPLICATIONS

This application is a continuation of U.S. patent application Ser. No. 12/030,352 filed Feb. 13, 2008, the contents of which are incorporated by reference herein in their entirety.

BACKGROUND OF THE INVENTION

This invention relates generally to buffer management systems, and more particularly to providing a shared storage buffer management scheme.

Typically, storage buffers are utilized within computing systems for the storage of data that is being delivered between software processes or data that has been retrieved from an input device for delivery to an output device. Generally, older I/O devices are configured to connect to a computing system via a 128 byte interface line, therefore cache and memory storage buffers were typically configured to support the 128 byte line size. However, newer I/O devices are configured to support 256 byte interface computing system connection lines—though the devices may also be configured to support 128 byte interface lines—thus necessitating the requirement that the cache and memory storage buffers within a computing system be configured to support a 256 byte line size.

Thus, it would be advantageous to be able to efficiently utilize storage buffers that are configured to support 128 byte and 256 byte I/O device interface lines.

BRIEF SUMMARY OF THE INVENTION

An exemplary embodiment includes a system for the management of I/O store buffers. The system comprises a data transmission component. The data transmission component of the system comprising a processor and a control unit, the control unit that is in communication with the processor. The system also comprises an I/O buffer component. The I/O buffer component comprises a state machine determining component, wherein the state machine component is configured to identify a plurality of logical state machines, the plurality of logical state machines being configured to receive data input from the data transmission component. The I/O buffer component also comprises a plurality data store buffers, the plurality of data store buffers being in communication with the plurality of logical state machines, wherein each data store buffer is associated with a respective logical state machine, the data store buffers being configured to be utilized individually with a corresponding logical state machine or utilized in pairs comprising a logical state machine data store buffer pair and a mate state machine data store buffer pair.

The I/O buffer component additionally comprises logic for determining if an I/O operation requires a single data store buffer or a data store buffer pairing. Also, logic for determining the validity of a plurality of state machines is comprised within the I/O buffer component, where in the instance that the use of a single data store buffer is required, the logic further determines if stored data has been read out of a buffer that is associated with the state machine in the instance that the state machine is determined to be valid and in the instance that the use of a data store buffer pair is required. The logic further determines if stored data has been read out of the buffer that is associated with a state machine and a buffer that is associated with a mate state machine that is associated with the state machine in the instance that the state machine is determined to be valid, wherein the mate state machine is not identified as being valid.

Another exemplary embodiment includes a method for managing I/O store buffers. The method comprises determining if an I/O operation requires a single data store buffer or a data store buffer pair and determining the validity of a plurality of state machines. In the instance that the use of a single data store buffer is required then a determination is made to if stored data has been read out of a buffer that is associated with the state machine in the instance that the state machine is determined to be valid. Further, in the instance that the use of a data store buffer pair is required a determination is made to if stored data has been read out of the buffer that is associated with a state machine and a buffer that is associated with a mate state machine that is associated with the state machine in the instance that the state machine is determined to be valid, wherein the mate state machine is not identified as being valid.

A further exemplary embodiment includes a computer program product that includes a computer readable medium useable by a processor, the medium having stored thereon a sequence of instructions which, when executed by the processor, causes the processor to manage a plurality of state machines and I/O store buffers that are associated with the plurality of state machines by determining if an I/O operation requires a single data store buffer or a data store buffer pair. Also, determining the validity of a plurality of state machines. In the instance that the use of a single data store buffer is required then a determination is made to if stored data has been read out of a buffer that is associated with the state machine in the instance that the state machine is determined to be valid. In the instance that the use of a data store buffer pair is required then a determination is made to if stored data has been read out of the buffer that is associated with a state machine and a buffer that is associated with a mate state machine that is associated with the state machine in the instance that the state machine is determined to be valid, wherein the mate state machine is not identified as being valid.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the invention is described below in detail. The disclosed embodiment is intended to be illustrative only since numerous modifications and variations therein will be apparent to those of ordinary skill in the art.

Aspects of the exemplary embodiment of the present invention can be implemented within a conventional computing system environment comprising hardware and software elements. The methodologies of the present invention can further be implemented to program a conventional computer system in order to provide software emulation of the prescribed tasks of the present invention as described below.

The exemplary embodiment of the present invention provides a storage buffer management scheme for I/O store buffers. Specifically, the storage buffer management system as described within the exemplary embodiment of the present invention is configured to comprise storage buffers that have the capability to efficiently support 128 byte or 256 byte I/O data transmission lines. The presently implemented storage buffer management scheme provides for a limited number of store buffers to be associated with a fixed number of storage state machines (i.e., queue positions) and thereafter allowing for the matched pairs to be allocated in order to achieve maximum store throughput for varying combinations of store sizes of 128 and 256 bytes.

As such, the exemplary embodiment comprises independently accessible store buffers (i.e., the buffers comprise separate read and write controls and data paths) in order to handle eight 128 byte stores, or four 256 byte stores, or any combinations thereof. The eight storage buffers are implemented to stage in I/O store data and hold the data until a transmission grant for the store data is received, at which time the store data is read out of the storage buffer and delivered to a cache. Utilized in combination with a buffer management scheme, the store buffers are enabled to handle maximum incoming bus throughput for a vary combination of data transfer sizes.

Figure 1:
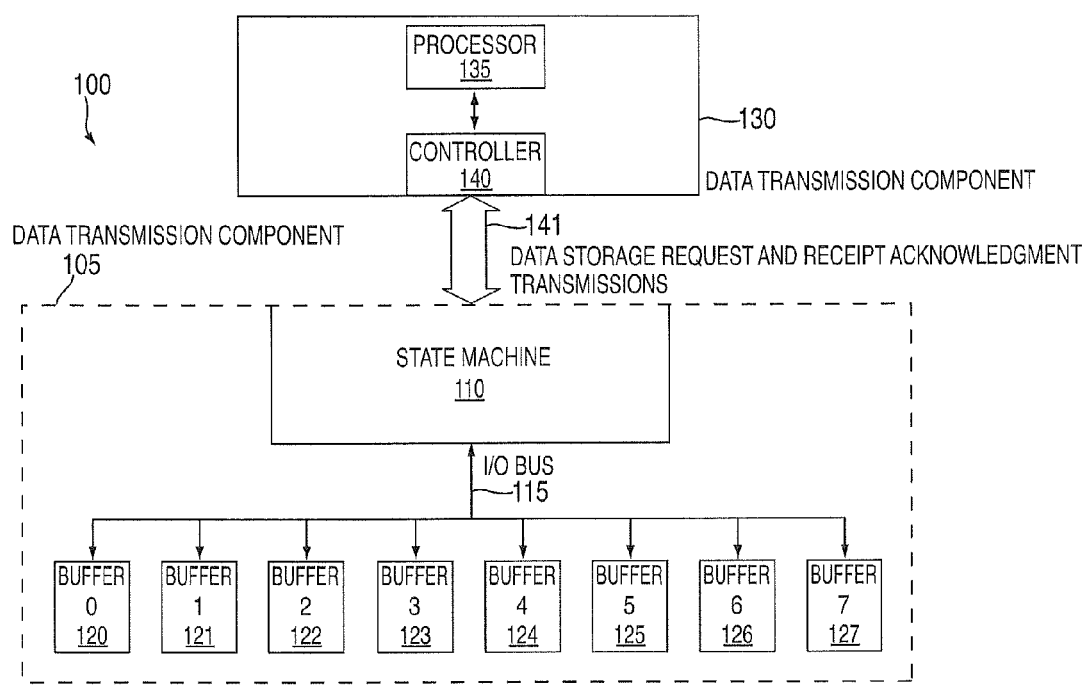
FIG. 1 shows a shared store buffer management system in accordance with exemplary embodiments of the present invention.

FIG. 1 shows an exemplary shared store buffer management system 100. As shown, the shared store buffer management system 100 comprises a data transmission component 130. The data transmission component 130 further comprises a processor 135 and a controller 140 that is in communication with the processor 135. The controller 140 is configured to execute a command and acknowledgement protocol for the transmittal of data stores 141, where in the event that a transmitted data store is rejected due to the lack of store buffer space, the control unit 140 will resend the data store until a successful delivery acknowledgment receipt is received from a data store receiver.

The shared store buffer management system 100 also comprises an I/O storage buffer component 105. The I/O storage buffer component further comprises a state machine determining component 110, the state machine determination component being configured to provide a fixed assignment between a state machine (queue position within the I/O storage interface) and a respective data store buffer (command buffer) for an 128 byte data store. Within this exemplary embodiment, two 128 byte data store buffers can be shared by an operation in order to provide a 256 byte data store. The I/O storage buffer component also comprises an I/O bus 115 for the delivery and retrieval of stored data, and a plurality of storage buffers 120-127. The state machine determination component 110 is further configured to determine if an I/O data storage operation requires the use of a single data store buffer or a data store buffer pairing.

Within an additional embodiment of the present invention each of the storage buffers 120-127 was associated with one of eight store state machines, the state machines having corresponding identifying numbers in the range of 0-7 with only the even numbered state machines being checked in the instance that a tandem state machine pairing was necessitated for a 256 byte data store operation. In the instance that a state machine was valid, the storage buffer 120-127 that was associated with the state machine was designated as unavailable. As such, any state machine that was actively working on a command of any length was considered to be valid. Further, the mate of the state machine that was working in tandem with the state machine on a 256 byte data store was also considered valid—since both storage buffers 120-127 that were associated with the state machine and the mate of the state machine were currently being utilized.

For 128 byte data store operations, state machines were checked for validity in a descending order. The first identified available state machine was in-gated and its corresponding storage buffer 120-127 was utilized for the store data operation. Thus, storage buffer 120-127 could not be used for another command operation until its corresponding state machine had completed the store operation, and thus was no longer considered to be valid. As a result, a storage buffer 120-127 was designated as being unavailable even after the data had been read out of the buffer.

For 256 byte stores, state machines were checked for validity in ascending order. The even numbered state machine in the first pair of available state machines was in-gated. The even-numbered state machine worked on a command, while the odd-numbered mate of the state machine was designated as being valid in order to reserve its associated storage buffer 120-127 for usage with the state machine's associated storage buffer 120-127.

Within the exemplary embodiment of the present invention the storage buffers 0-7 (120-127) are associated with one of eight store state machines, the state machines having corresponding identifying numbers in the range of 0-7. However, each state machine is checked in the instance that a tandem state machine pairing is necessitated for a 256 byte data store operation. That is, since the data is read out of a storage buffer 120-127 before a store state machine is designated as being invalid, the validity of the state machines and the availability of their associated storage buffers 120-127 are kept track of separately. The state machine determination component 110 assigns 128 byte store buffers 120-127 beginning at one end of a queue, and 256 byte store buffers beginning at the opposite end of the queue. Stores of differing sizes are kept segregated in order to maximize the ability to pair two adjacent storage buffers 120-127 for 256 byte stores, while keeping the buffer assignment algorithm as simple as possible.

Within the exemplary embodiment the 128 byte data stores buffers 120-127 are considered to be available as soon as the data is read out of the storage buffer 120-127 regardless of the validity of the storage buffer's corresponding state machine. Further, the mate of a state machine in a 256 byte state machine pairing is not marked as valid. Therefore, as soon as the data is read out of the storage buffers 120-127, the storage buffers 120-127 are considered to be available, and thus may respectively be used immediately by the state machine and the pair mate of the state machine.

As such, the state machine determination component 110 is configured to determine the validity of a plurality of state machines in the instance that the use of a single store buffer is required. Further, the state machine determination component 110 is configured to determine if stored data has been read out of a buffer that is associated with the state machine in the instance that the state machine is determined to be valid and in the instance that the use of a data store buffer 120-127 pair is required. Yet further, the state machine determination component 110 is further configured to determine if stored data has been read out of the store buffer 120-127 that is associated with a state machine and a buffer that is associated with a mate state machine that is associated with the state machine in the instance that the state machine is determined to be valid.

Figure 2:
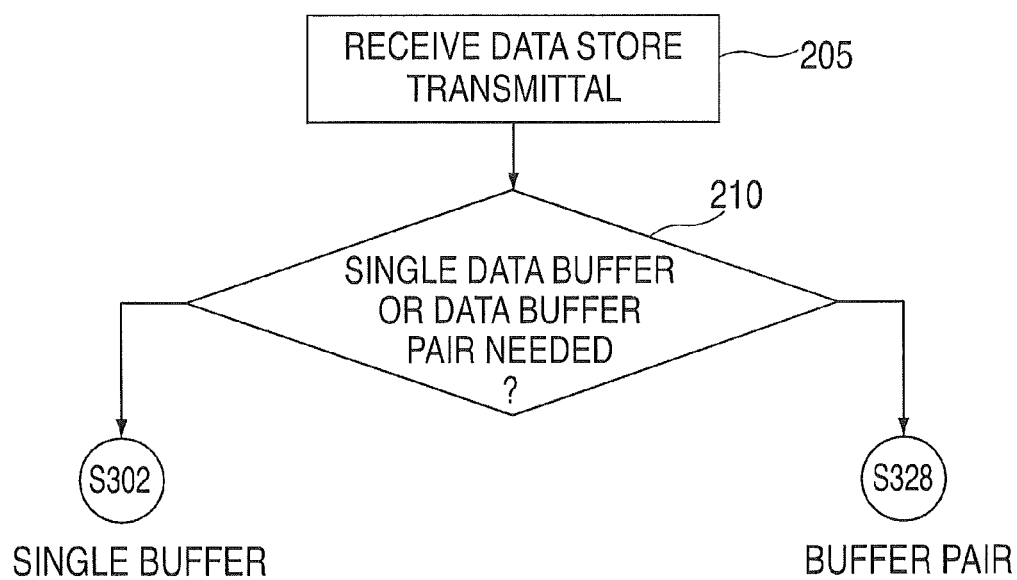
FIGS. 2, 3A, and 3B are diagrams of a method for ascertaining storage buffer availability in accordance with exemplary embodiments of the present invention.
Figure 3A:
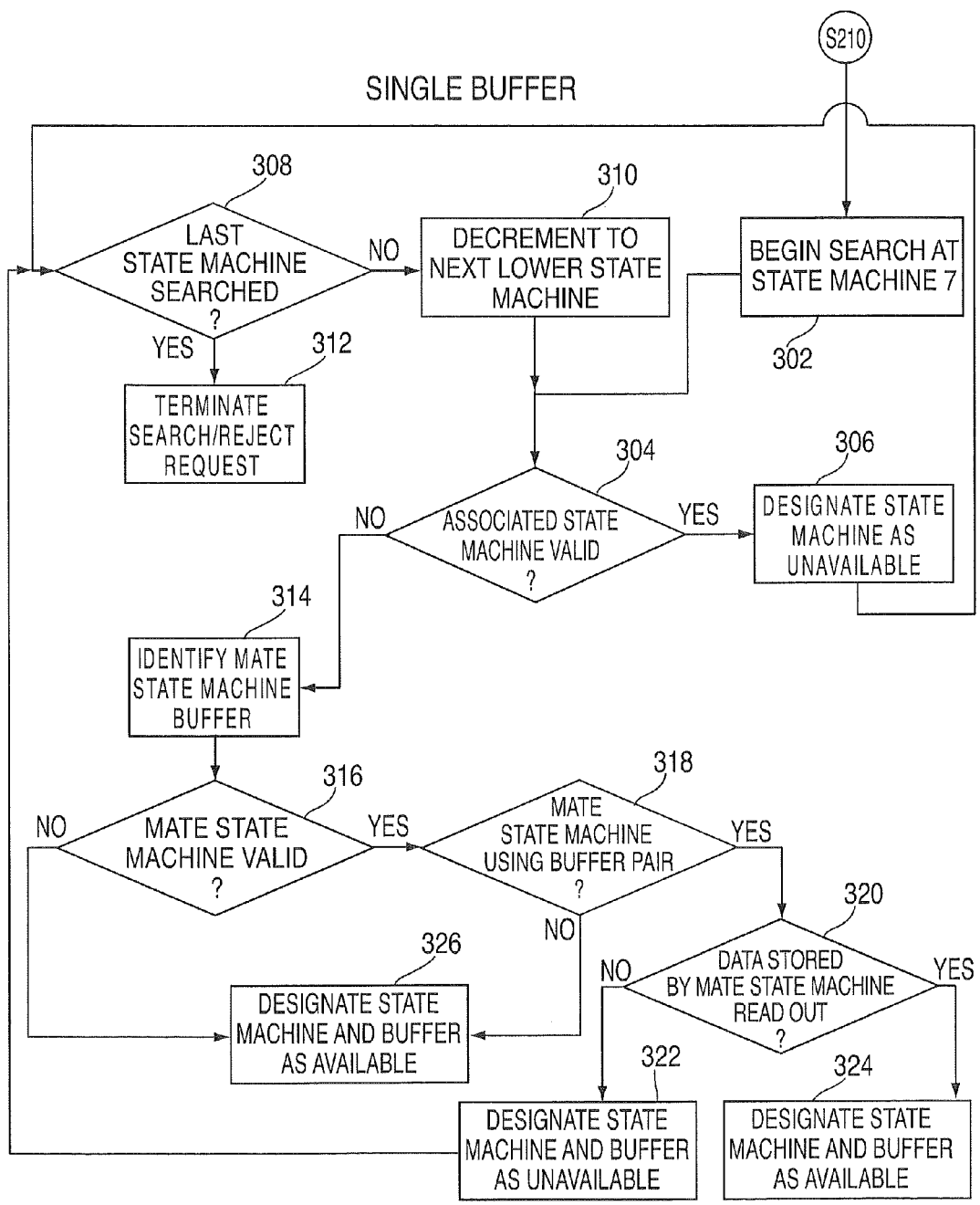
Figure 3B:
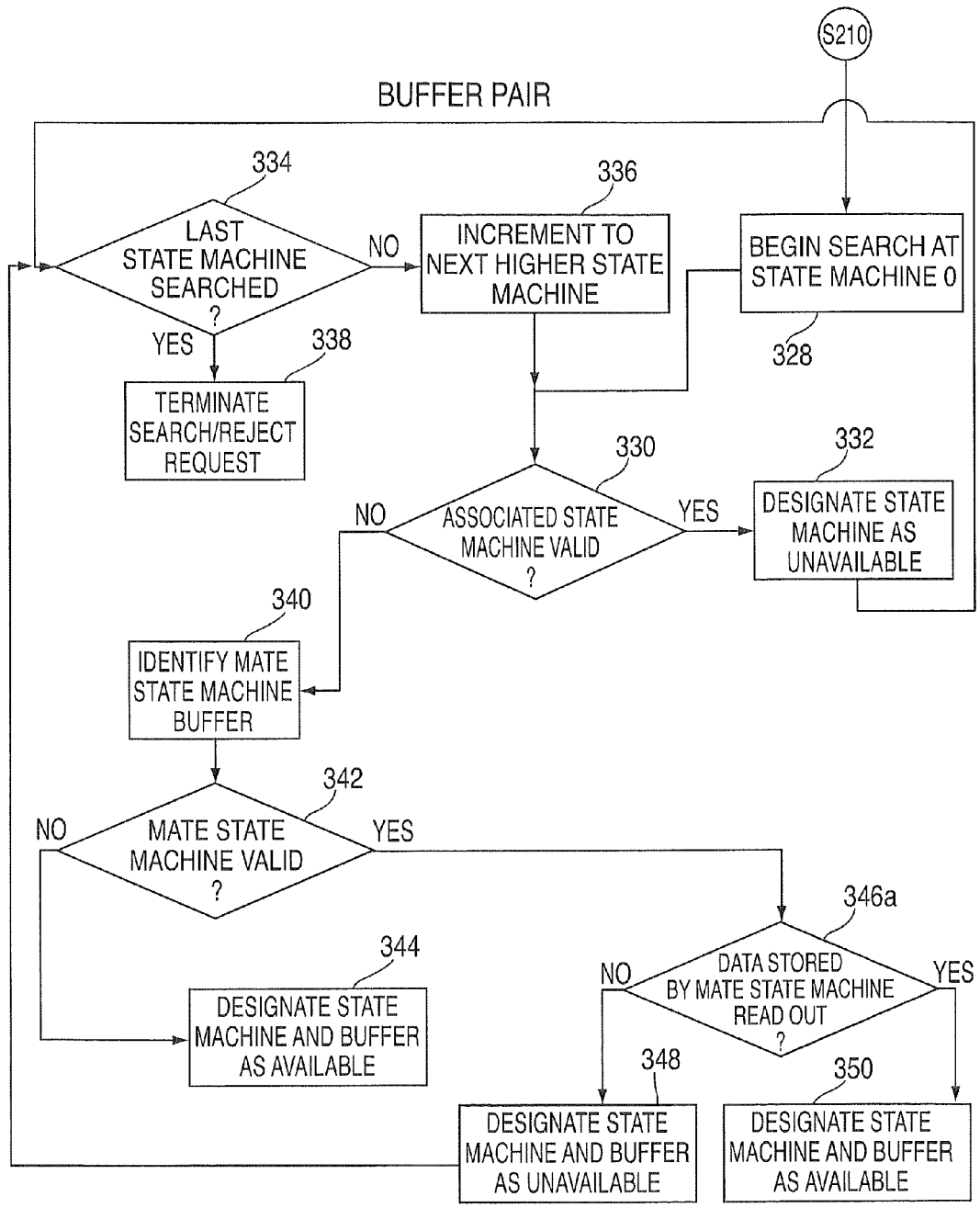

FIGS. 2 and 3 illustrate a method for ascertaining storage buffer availability in accordance with the exemplary embodiment of the present invention. As shown in FIG. 2, data store is received at state machine determination component 110 of the data transmission component 105 (step 205). A determination is made at the state machine determination component 110 if a single storage buffer or a pair of storage buffers 120-127 will be needed in order to fulfill the request (step 210). In the instance that it is determined that a single storage buffer 120-127 will be sufficient to service the storage request then the state machines that are associated with each storage buffer 120-127 are checked for validity (step 304) either sequentially or concurrently in a descending order in the range from 7 to 0 (step 302, 308, 310). If a state machine is found to be invalid, then the storage buffer 120-127 that is associated with the state machine is checked for availability by determining whether the identified mate state machine (step 314) is invalid and therefore not using the buffer (step 316) and available to be in-gated (step 326), or in the case the mate state machine is valid, whether the mate state machine is using the buffer as part of a buffer pair (step 318), and whether the mate state machine has read out the buffer (step 320). In the event the state machine and buffer are both available (step 326, 324), the invalid state machine can be in-gated and its associated storage buffer 120-127 can be utilized for the storage of the transmitted data store.

In the instance that a state machine is found to be valid, then the state machine and storage buffer 120-127 that is associated with the state machine are ineligible to accept a new store as the state machine is required to track ownership and progress of the associated data (step 306). The storage buffer 120-127 can thus be utilized for the storage of transmitted data for a mate store in a mate state machine prior to the state of the state machine being changed to invalid.

In the event that the data stored at the storage buffer 120-127 that is associated with the mate state machine has not been read out, then the storage buffer is designated as unavailable (step 322). If all of the storage buffers that are associated with the state machines 7-0 are determined to be unavailable then the request will be denied (step 312).

In the instance where it is determined that a state machine and a buffer pairing (a state machine of the order 0, 2, 4, and 6 and a corresponding buffer pairing of the order 0 and 1, 2 and 3, 4 and 5, or 6 and 7, or a state machine of the order 1, 3, 5, or 7 and a corresponding buffer pairing of the order 0 and 1, 2 and 3, 4 and 5, or 6 and 7) are needed in order to service the storage request then a state machine checking operations will be executed either sequentially or concurrently in ascending order in the range from 0 to 7 (steps 328, 334, 336). At step 330 each of the state machines that is associated with each storage buffer 120-127 are checked for validity in an ascending order 0-7. If a state machine is found to be invalid, then the mate state machine that is associated with the state machine is identified (step 340) and the validity of the mate state machine is tested (step 342). The mate state machine for 0 is 1, the mate state machine for 1 is 0. The mate state machine for 2 is 3; the mate state machine for 3 is 2. The mate state machine for 4 is 5, the mate state machine for 5 is 4. The mate state machine for 6 is 7; the mate state machine for 7 is 6. If the mate state machine is also not valid, then the state machine and its associated buffer 120-127 and the buffer for the mate state machine 120-127 can thereafter be in-gated and utilized for the storage of the transmitted data store (step 344). Further, if the associated mate state machine is found to be valid (step 342) the storage buffer 120-127 that is associated with the mate state machine is tested to determine if it has been read out by the mate state machine (step 346). In the event that the mate state machine has read out the buffer, the state machine and its associated buffer 120-127, and the buffer for the mate state machine 120-127 can thereafter be in-gated and utilized for the storage of the transmitted data store (step 350). Further, if the associated state machine is found to be valid, and its data buffer has not been read out, then the state machine and its buffer are designated as unavailable and the buffer for the mate state machine cannot be in-gated for the store (step 348).

In the instance that a state machine is found to be valid (step 330), then the state machine is determined to be unavailable and ineligible to in-gate the store (step 332) regardless of whether the data buffer has been read out. In the event that the data stored at the corresponding storage buffer 120-127 has been read out, then the storage buffer 120-127 that is associated with the state machine may be found to be available for use as a pair buffer by the mate state machine. In the event that the data stored at the storage buffer 120-127 that is associated with the state machine has not been read out, then the storage buffer must also be found to be unavailable by the mate state machine.

If all of the state machines and buffer pairs 120-127 associated the state machines 0-7 are determined to be unavailable then the request will be denied (step 338).

Within the exemplary embodiment the state machine determination component 110 is configured to implement a buffer assignment protocol that enables a minimum number of storage buffers 120-127 to be utilized while achieving predetermined performance objectives for varying store data transfer sizes. This is accomplished via the use of semi-floating buffer assignment protocols that allow the storage buffers 120-127 to be subject to fixed assignments with corresponding command buffers for 128 byte stores and to be shared between two command buffers for 256 byte stores.

Within a further exemplary embodiment of the present invention the state machine determination component implements an early storage buffer 120-127 release protocol that allows for two 128 byte storage buffers 120-127 to be utilized a one 256 byte storage buffer and be time-shared between two command buffers, further allowing for the release of the storage buffers when the store data has been forwarded and before the command buffer has completed processing the received command. Further, the state machine determination component 110 implements a command buffer protocol that allows a second command queue position to claim a 256 byte storage buffer 120-127 pairing as soon as the mate command queue position has released the buffers, thus maximizing the busy time and utilization of the storage buffers 120-127.

Within the exemplary embodiment the control unit 140 of the data transmission component 130 is further configured to implement a data transmission command and acknowledge protocol that allows data transmission component to transmit data stores to the I/O storage buffer component 105 that may be accepted or that may be retransmitted in the instance that the transmittal is rejected for lack of available storage buffer 120-127 space at the I/O storage buffer component 105. Within the exemplary embodiment there are three identified storage buffer 120-127 availability states. These states being: situations of assured buffer availability—that is when three or fewer stores are active with accompanying data; situations of uncertain buffer availability—that is when four or more stores buffers 120-127 are active, then buffer availability depends on data sizes and whether storage buffers 120-127 have yet been released; or no storage buffer 120-127 availability.

The control unit 140 of the data transmission component 130 is further configured to determine when it is safe to send a next data store in an ordered sequence of data stores. The data transmission component can queue up and have in transit multiple data stores, therefore the control unit has the capability to determine when it is safe to place multiple data stores requiring order in the queue. This is because if one data store is not accepted due to data storage buffer 120-127 unavailability, a following data store might be accepted due to different availability at the time of delivery. This sequence of having rejected data stores and then accepted data stores were to occur to a set of data stores that are required to be executed in order could lead to the data stores being executed out of order.

The control unit 140 is further configured to deterministically track the availability of store command queues and probabilistically project the availability of data store buffers 120-127 in order to determine when a data store may be sent and have a good probability of being accepted. Further, the control unit 140 attempts to retransmit a data store if the projection of data storage buffer 120-127 availability is incorrect in order to maximize store buffer usage at the receiver while minimizing retransmission of data not accepted due to a buffer full condition. In the instance the acceptance of a following data store is not certain, an absolute hold (rather than a probabilistic hold) is placed on the following store if acceptance is not certain until a positive acknowledgement is received in the instance that the following store is required to be executed in order after the preceding store, and thereafter the ordered data stores are retransmitted in the assigned order.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A system for the management of I/O store buffers, the system comprising:
   a data transmission component, wherein the data transmission component comprises:
   a processor; and
   a control unit, the control unit in communication with the processor, the system configured to perform a method comprising:
   identifying a plurality of logical state machines, the plurality of logical state machines configured to receive data input from the data transmission component;
   associating each of a plurality of data store buffers to a respective logical state machine from the plurality of logical state machines, the data store buffers configured to be utilized individually with a corresponding logical state machine or utilized in pairs comprising a logical state machine data store buffer pair and a mate state machine data store buffer pair; and
   determining if an I/O operation requires a single data store buffer or a data store buffer pairing;
   in response to determining that a single data store buffer is required, performing:
      determining if stored data has been read out of a buffer that is associated with the state machine in the instance that the state machine is determined to be inactive; and
      determining if stored data has been read out of a buffer that is associated with the state machine in the instance that the mate state machine has claimed the buffer and the mate state machine is determined to be active; and
   in response to determining that a data store buffer pair is required, performing:
      determining if stored data has been read out of the buffer that is associated with a state machine and a buffer that is associated with a mate state machine that is associated with the state machine in the instance that the state machine is determined to be inactive, wherein the mate state machine is identified as being active; and
      configuring a secondary command queue position to claim a data buffer pair that is associated with a state machine and the mate state machine that is associated with the state machine as soon as a mate command queue position releases the buffers that are associated with the state machine and the mate state machine.

2. The system of claim 1, further comprising identifying a buffer as available when the stored data is read out of the buffer regardless of the validity of the state machine that is associated with the buffer.

3. The system of claim 1, further comprising identifying the buffer that is associated with the state machine and the buffer that is associated with the mate state machine as available when the stored data is read out of the buffers regardless of the validity of the state machine.

4. The system of claim 1, further comprising assigning the single data store buffers and the data store buffer pairings in descending order from opposite ends of a data queue.

5. The system of claim 4, wherein data store buffers of differing sizes are segregated in order to maximize an ability to pair two adjacent data store buffers in order to implement a data store buffer pair.

6. The system of claim 5, where in the instance that an I/O buffer component rejects a data store due to the lack of available data store buffer space the control unit is configured to retransmit the data store to the I/O buffer component.

7. The system of claim 6, wherein the control unit is further configured to track availability of data store buffer command queues and determine the availability data store buffers in order to determine when data stores may be transmitted with a high probability of being accepted at the I/O buffer component.

8. The system of claim 7, wherein the control unit is configured to hold a secondary data store until a positive delivery acknowledgment for a primary data store is received.

9. The system of claim 8, where in the instance that the secondary data store is required to be executed in order after the primary data store, the primary and secondary data stores are retransmitted in their assigned transmission order.

10. A computer implemented method for managing I/O store buffers, the method comprising:
    identifying, via a computer, a plurality of logical state machines, the plurality of logical state machines configured to receive data input from a data transmission component;
    associating, via a computer, each of a plurality of data store buffers to a respective logical state machine from the plurality of logical state machines, the data store buffers configured to be utilized individually with a corresponding logical state machine or utilized in pairs comprising a logical state machine data store buffer pair and a mate state machine data store buffer pair; and
    determining, via a computer, if an I/O operation requires a single data store buffer or a data store buffer pairing;
    in response to determining that a single data store buffer is required, performing:
        determining if stored data has been read out of a buffer that is associated with the state machine in the instance that the state machine is determined to be inactive; and
        determining if stored data has been read out of a buffer that is associated with the state machine in the instance that the mate state machine has claimed the buffer and the mate state machine is determined to be active; and
    in response to determining that a data store buffer pair is required, performing:
        determining if stored data has been read out of the buffer that is associated with a state machine and a buffer that is associated with a mate state machine that is associated with the state machine in the instance that the state machine is determined to be inactive, wherein the mate state machine is identified as being active; and
        configuring a secondary command queue position to claim a data buffer pair that is associated with a state machine and the mate state machine that is associated with the state machine as soon as a mate command queue position releases the buffers that are associated with the state machine and the mate state machine.

11. The method of claim 10, further comprising identifying a buffer as available when the stored data is read out of the buffer regardless of the validity of the state machine that is associated with the buffer.

12. The method of claim 11, further comprising identifying the buffer that is associated with the state machine and the buffer that is associated with the mate state machine as available when the stored data is read out of the buffers regardless of the validity of the state machine.

13. The method of claim 10, further comprising assigning the single data store buffers and the data store buffer pairings in descending order from opposite ends of a data queue.

14. The method of claim 13, wherein data store buffers of differing sizes are segregated in order to maximize an ability to pair two adjacent data store buffers in order to implement a data store buffer pair.

15. The method of claim 14, where in the instance that an I/O buffer component rejects a data store due to the lack of available data store buffer space a control unit is configured to retransmit the data store to an I/O buffer component.

16. The method of claim 15, wherein the control unit is further configured to track availability of data store buffer command queues and determine the availability data store buffers in order to determine when data stores may be transmitted with a high probability of being accepted at the I/O buffer component.

17. The method of claim 16, wherein the control unit is configured to hold a secondary data store until a positive delivery acknowledgment for a primary data store is received.

18. The method of claim 17, where in the instance that the secondary data store is required to be executed in order after the primary data store, the primary and secondary data stores are retransmitted in their assigned transmission order.

* * * * *